United States Patent

[11] 3,558,949

| [72] | Inventor | Philip H. Evans |
| | | Wollaston, Stourbridge, England |
| [21] | Appl. No. | 792,864 |
| [22] | Filed | Jan. 21, 1969 |
| [45] | Patented | Jan. 26, 1971 |
| [73] | Assignee | BSR Limited |
| | | Warley, England |
| | | a British Company |
| [32] | Priority | Jan. 27, 1968 |
| [33] | | Great Britain |
| [31] | | 4363/68 |

[54] BRUSH ASSEMBLY FOR ELECTRICAL EQUIPMENT
1 Claim, 4 Drawing Figs.

[52] U.S. Cl. .................................................. 310/239
[51] Int. Cl. ................................................. H01r 39/38, H02k 13/00
[50] Field of Search .................................... 310/230, 239, 238, 241, 247, 242, 245

[56] References Cited
UNITED STATES PATENTS

| 1,469,720 | 10/1923 | Dorsey | 310/239 |
| 2,537,714 | 1/1951 | Spielman | 310/239 |
| 2,663,810 | 12/1953 | Stein | 310/238 |
| 3,026,432 | 3/1962 | Baumhart | 310/239 |
| 3,087,081 | 4/1963 | Apostoleris | 310/247 |
| 3,182,218 | 5/1965 | Videtic | 310/239 |

*Primary Examiner*—Milton O. Hirshfield
*Assistant Examiner*—L. L. Smith
*Attorney*—Kurt Kelman ABSTRACT: A brush holder for use with an electric motor having a two-part outer casing of cylindrical form, each half having an axially extending slot running from one end so that the slots are 180° apart and the brush holder comprising an annular ring of plastics material having two brush housings formed integrally therewith 180° apart and each housing having a radially outwardly projecting part which fits in one of the slots in the casing when the annular ring is slid into the casing from one end.

PATENTED JAN 26 1971

INVENTOR
PHILIP H. EVANS

BY Chakelman
AGENT

INVENTOR
PHILIP H. EVANS

BRUSH ASSEMBLY FOR ELECTRICAL EQUIPMENT

BACKGROUND OF THE INVENTION

This invention relates to brush assemblies for electrical equipment (e.g. electric motors and the like) and the invention is particularly concerned with such electrical equipment of the size normally encountered in domestic apparatus, such as vacuum cleaners, refrigerators, washing machines, food mixers, etc.

The brush holders need to be spaced in accurate relative angular relationship about the axis of the rotor of an electric motor for example, and for example, where there are two brushes, these must be accurately aligned at diametrically opposite positions, or in other words at a relative angular spacing of 180° about the axis of the rotor.

DESCRIPTION OF THE PRIOR ART

This means that the brush holders which hitherto have been made separately, for mounting in the cylindrical casing of the apparatus, have to be positioned accurately in such casing which means an accurate operation upon the casing to provide the apertures and mounting means to receive the brush holders. Thus hitherto this operation has tended to make the construction of the casing and brush holders a relatively expensive matter also requiring skilled labour.

It is the object of this invention to provide an improved arrangement for mounting of brush holders which will considerably reduce the cost of manufacture and assembly and also enable the assembly operations to be carried out without the use of highly skilled labour.

SUMMARY OF THE INVENTION

According to the invention there is provided means for mounting brush holders in electrical equipment (such as an electric motor) having a cylindrical outer casing, comprising an annular ring, preferably formed of electrically insulating material, and having brush holder housings formed integrally therewith, each such housing having a part projecting radially outwardly from the ring and the casing having in its wall a number of slots corresponding to the number and relative angular spacing of the brush housings, each slot extending inwardly from one open end of the casing in a direction parallel to the axis of the casing and the annular ring being inserted into the casing from this end so that the said housings engage in the said slots.

BRIEF DESCRIPTION OF THE DRAWINGS

The invention is illustrated in the accompanying drawings wherein.

DESCRIPTION OF THE PREFERRED EMBODIMENT

Figure 1:
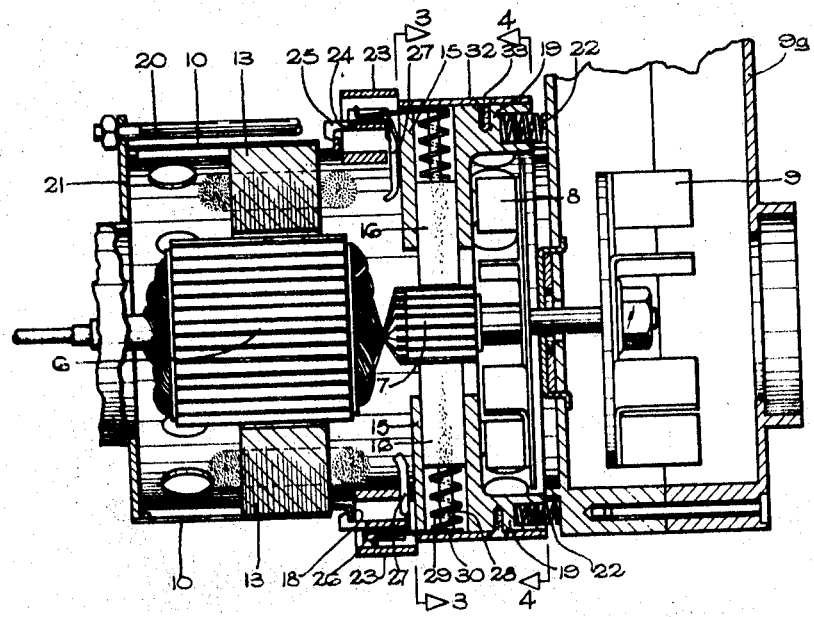
FIG. 1 is a section on the line 1–1 of FIG. 2.

The drawings show the application of the invention to the casing of an electric motor in a vacuum cleaner and in the sub assembly shown, 6, is the rotor, 7 the commutator, 8 the cooling fan impeller, 9 the impeller of the vacuum cleaner exhaust fan and 9A the housing of the fan 9.

In the drawings, the two identical halves of the casing are shown at 10 and each half is made from a flat blank, initially of rectangular form, which is operated upon in a suitable press to form it to the substantially semicylindrical form shown in the drawings and at the same time provide it with the various lugs, apertures, and strengthening ribs hereinafter referred to.

Figure 3:
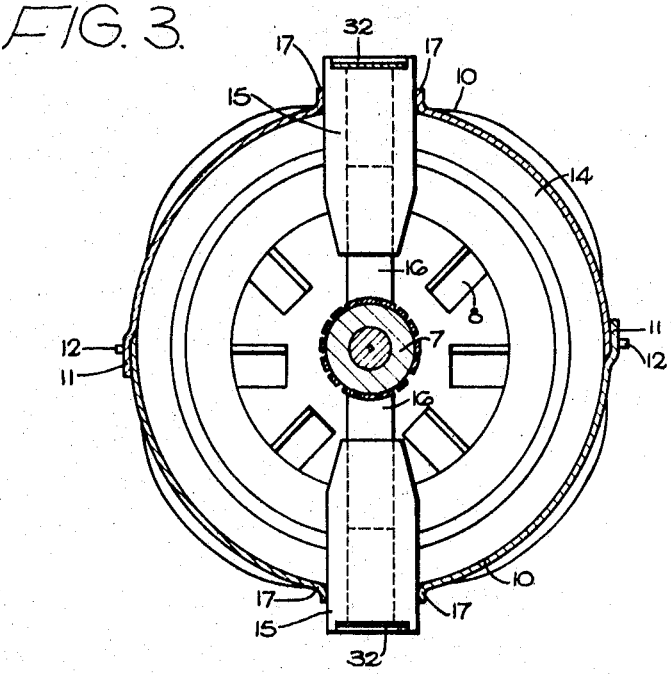
FIG. 3 is a section on the line 3–3 of FIG. 1.
Figure 4:
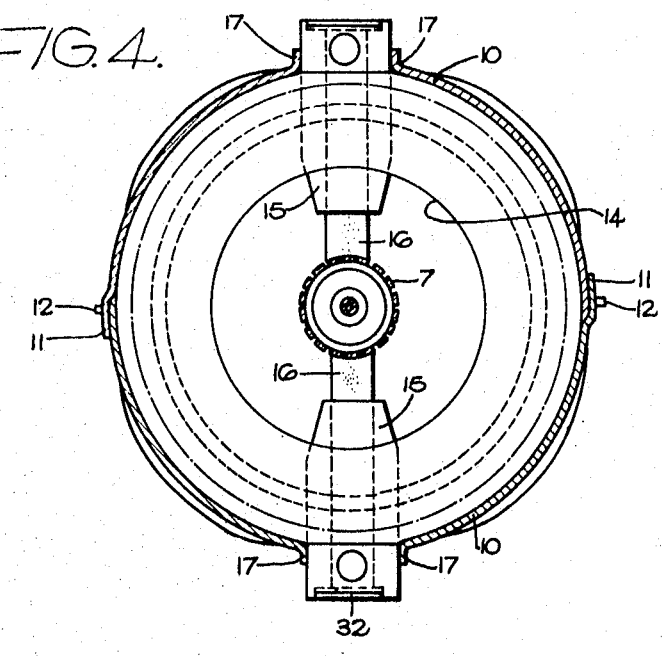
FIG. 4 is a section on line 4–4 of FIG. 1 with the cooling fan impeller omitted.

It will be observed that one edge of each half 10 is cranked, as indicated at 11 (in FIGS. 3 and 4), so that when the two halves are assembled together these edges overlap to form a substantially cylindrical enclosure and also one edge of each half 10 is formed with a pair of radially outwardly projecting lugs 12 whilst the other edge of each pair is provided, in the appropriate positions, with slots to receive the lugs 12 when the two parts are brought together so that by a simple manipulation, the lugs 12 can be passed through the appropriate slots and the substantially cylindrical casing then produced (as seen in FIGS. 3 and 4).

At this stage, as there is no very tight fit of the lugs 12 in their appropriate slots, the two parts 10 are not held together in strictly rigid relationship and thus it is possible to insert into this substantially cylindrical casing, a truly cylindrical and rigid member such as the stator 13 of the electric motor and this has the effect of stiffening up the two-part cylindrical casing so as to make it take a substantially true cylindrical form and force the lugs 12 into hard engagement with the edges of their slots so that once such interior cylindrical member has been inserted, the combination thereof with the two-part casing, forms a rigid structure and also imparts a substantially true cylindrical configuration to the two-part casing. Any further cylindrical member which is inserted into the casing will add further to the rigidity of the structure.

The annular ring 14 forming the brush holder assembly is preferably formed as a moulding in a suitable plastics material having electrical insulating properties and, at diametrically opposite positions, the moulding is formed with brush housings, indicated at 15, each of which has a radially extending passage in which is fitted a brush 16 which is pring pressed against the commutator 7.

Figure 2:
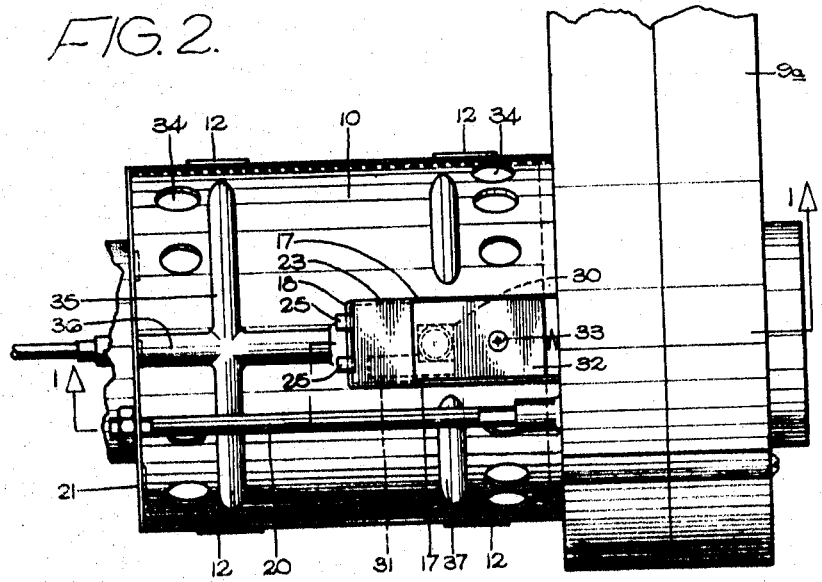
FIG. 2 is a plan view of an assembled casing also showing assembled therein a brush holder unit.

Each half 10 of the casing has an open ended slot cut therein and extending in the axial direction from one end of the casing. As seen in FIGS. 2, 3 and 4, each such slot, which is rectangular in shape, is defined by the outwardly turned lips 17 along the sides and the outwardly turned lips 18 at its inner closed end.

Also each housing 15 has an axially projecting part 19 which, together with the outer part of the housing 15, fits in one of the aforesaid slots in the casing. The complete assembly of the electric motor is fixed to the fan casing 9A by a number of tie rods passing through holes in the lugs formed on the periphery of an end bearing plate 21 which fits into the one end of the casing 10, 10 and further assists in maintaining the rigidity and cylindrical form of the two part casing. Each part 19 of the brush holder has an axially extending blind hole in which is a spring 22 bearing against the sidewall of the fan casing 9A.

In assembly, the brush holder is inserted into the casing 10, 10 from the right hand end (FIG. 1) by sliding the housings 15 and parts 19 into the aforesaid slots in the casing.

Associated with each brush housing 15, in the slot in the casing, is a separate electrical terminal housing 23, also made as a moulding in suitable plastics material, and in the form of an open ended rectangular frame with a rib 24 extending between its sides, each rib 24 having two projecting noses 25 which hook over the lips 18 on the casing to hold the terminal housing 23 in place in its slot in the housing. On the outer face of each rib 24 is fitted a metal terminal piece 26 with which electrical mains supply leads can be engaged and each terminal piece 26 also has a tag to connect to a lead 27 for the field windings of the stator.

Each brush 16 has a stem 28 around which is the spring 29 which acts on the brush and a metal spring strip 30 extends from the outer end of the stem 28 and has a leg 31 (see FIG. 2) making electrical contact with its associated terminal piece 26. A plate 32, of insulating material is secured to the part 19 of each housing 15 by a screw 33 and covers the outer end of the opening through the housing.

When forming the two parts 10 of the casing from the initial flat blanks, the slots which make the housings 15 of the brush holder are provided in a single pressing operation simultaneously with other apertures, as shown at 34, for the cooling fan 8, the lugs 12 and their associated slots and the lips 17 and 18. Also, for strengthening purposes, ribs such as those shown at 35 and 36 and also 37 may be formed in the same operation upon the flat blanks forming the two parts 10, 10 of the casing.

The invention thus provides a brush holder assembly of unitary form which ensures that the brush housings are accurately spaced apart angularly about the axis of the rotor of the electrical equipment and also enables easy assembly of this unitary brush holder member in the casing without requiring the use of any complicated jigging or tooling or the use of any highly skilled labour.

Although the brush holder forming the subject of this invention may be used with any form of cylindrical casing it is most advantageously used with the two part casing herein described and forming the subject of our copending application.

I claim:

1. In combination with electrical equipment having a cylindrical outer casing made in two halves, a brush holder comprising an annular ring formed of electrically insulating material and having two brush housings formed integrally therewith at diametrically opposed positions, each such housing having a radial passage open at the inner end thereof, a brush being mounted in said radial passage and spring means being provided for urging the brush in the radially inward direction, and each housing also having a part projecting radially outwardly from the ring, the casing having two diametrically opposed slots, each slot extending inwardly from one open end of the casing in a direction parallel to the axis of the casing, and the brush holder being inserted into the casing from said slotted end, to hold the two halves of the casing rigidly in cylindrical form, the radially outwardly projecting parts of the housing engaging in the slots.